April 9, 1968   J. O. SCHAEFER   3,376,963
CLUTCH WITH IMPACT INERTIA BRAKE
Filed April 22, 1966
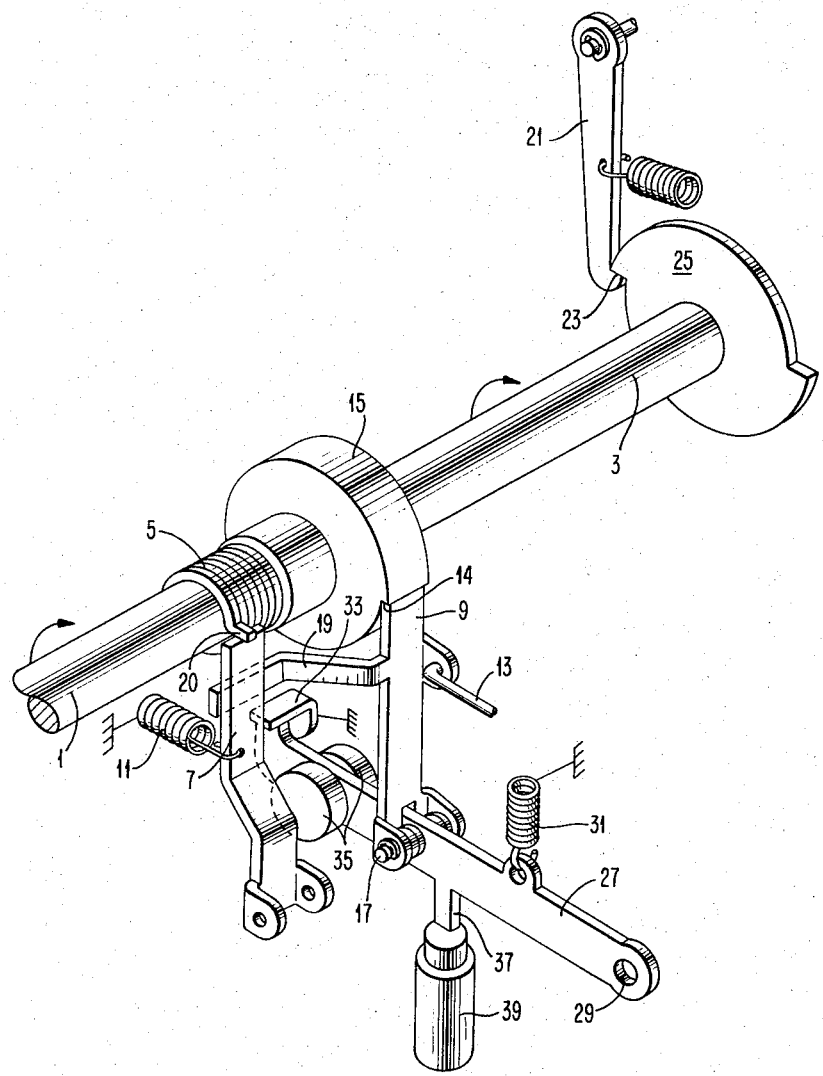
INVENTOR.
JOHN O. SCHAEFER
BY John A. Brady
ATTORNEY.

United States Patent Office 3,376,963
Patented Apr. 9, 1968

3,376,963
CLUTCH WITH IMPACT INERTIA BRAKE
John O. Schaefer, Lexington, Ky., assignor to International Business Machines Corporation, Armonk, N.Y., a corporation of New York
Filed Apr. 22, 1966, Ser. No. 544,439
10 Claims. (Cl. 192—12)

This invention relates to the braking of moving objects or mechanisms and more particularly to the almost instantaneous stopping of motion.

In the prior art braking is generally accomplished by connecting a moving object to an energy absorbing mechanism and preserving such a connection until all the kinetic energy of motion is absorbed. Thus, in an automobile braking system the brake drum is a direct link to the moving automobile while the brake lining absorbs kinetic energy by changing the kinetic energy of motion to heat energy. During a braking operation the lining is pressed against the drum for as long as required to transform the kinetic energy to heat.

No practical braking system is known in which the braking does not rely on a connection which continues a significant time until energy is transformed to some other form. Such systems either require relatively long periods to achieve full braking or they require special equipment to achieve energy transformation in a relatively short period of time.

It is an object of this invention to provide a system for almost instantaneous braking.

It is another object of this invention to provide highly efficient and fast braking with simple, economic structures.

It is a more specific object of this invention to provide a braking structure which operates in a short time and is particularly suited for incorporation into relatively small mechanical mechanisms such as the mechanical mechanisms of a typewriter or printer.

Fast braking can be critical in mechanical and other apparatus which is to function at the highest speed possible. But simply obstructing the path of movement of a moving member with a relatively immobile obstruction may be unsatisfactory since the member will bounce and otherwise rebound from the obstruction. Bounce can continue for a relatively long period of time, and during this time the mechanism is in an ambiguous condition which may make further mechanical operations impossible as a practical matter of operation or design. Therefore, positive, fast stopping of a moving member can be highly desirable and is not easily obtained.

In accordance with this invention a braking member which is mobile in the direction of movement of the member to be braked is selectively moved into the path of the member to be braked. The acceleration inertia of both the moving member and the braking member are selected to be substantially identical. (Acceleration inertia is herein defined as that property of a body to begin acceleration only after an extremely short time delay related to its properties and characteristics as a bulk structure. An example of the effects of acceleration inertia is when two, identical billiard balls, inherently having identical acceleration inertias, collide in a direct hit. One comes to a very sudden stop and almost all of the energy of motion is transferred to the other.) The moving member in accordance with this invention therefore comes to a very quick stop and this is accompanied by substantially no bounce. The braking member freely moves away, and its energy may be dissipated during any subsequent period of time.

Another description of the property used, which is perhaps somewhat more limited and specific, may be stated in terms of the masses of the moving and braking structures. Thus, each structure has an effective or equivalent mass at the point of contact with the other structure. When these two masses are equal, the structures trade velocities at the point of contact.

Applicant knows of no system which uses or even attempts to use the phenomena herein defined as acceleration inertia in any manner similar to the practical breaking system herein described. The phenomena exists, of course, and is known and does occur in certain systems. Thus, the skilled billiard player uses the phenomena when he aims for a direct hit knowing that the moving ball will be stopped suddenly. In one major museum an experiment illustrating the phenomena is shown in which several balls similar to bowling balls are each hung from a cord in a configuration such that the balls normally rest side by side. In the display, two balls, for example, can be moved away and allowed to swing back under the force of gravity. When they hit the stationary balls, the moving balls stop dead and two balls at the other end fly off. However, a significant point with reference to those prior understandings is that they represent an empirical awareness not coupled with an appreciation that the phenomena can and should be designed into different, practical systems.

The foregoing and other objects, features and advantages of the invention will be apparent from the following more particular description of a preferred embodiment of the invention, as illustrated in the accompanying drawings.

The figure shows the preferred system, which is a brake for the cycling mechanisms of a single print element typewriter.

The mechanism shown has a drive shaft 1 which is directly linked by mechanisms (not shown) to a normally continuously operating motor. Thus, drive shaft 1 is continuously rotating.

Drive shaft 1 is intermittently linked to driven shaft 3 through a spring clutch 5. This arrangement is essentially identical to the drive mechanisms of certain single element typewriters now sold commercially in this country. In fact, the mechanism described herein is basically different only in the braking system employed.

During operation the spring clutch interposer 7 and brake interposer 9 are pivoted into stopping relationship as shown in the drawing by the action of spring 11, provided link 13 is freed to allow this movement. Interposer 9 abuts a ledge 14 of brake wheel 15. Brake wheel 15 is integral with driven shaft 3.

To initiate a cycle, link 13 is pulled by conventional mechanisms (not shown) rightwardly as seen in FIG. 1. This frees brake wheel 15 from obstruction by interposer 9, interposer 9 being pivoted on pin 17. Simultaneously, arm 19, which is integral with interposer 9, pulls spring clutch interposer 7 out from under the end tab 20 of spring 5.

Driven shaft 3 is then free to turn without any obstruction from interposer 9. Spring 5 is free to tighten around drive shaft 1, and as it tightens around drive shaft 1, the angular motion of drive shaft 1 contributes to further tightening of spring 5 and spring 5 then tightens down to become a firm rotating connection between shaft 1 and shaft 3. Shaft 3 then begins to turn. [Cams (not shown) linked to driven shaft 3 push bails and similar elements in the mechanism of the typewriter (not shown) to thereby power and execute the typing function in a manner now known in the art (for example, the IBM "Selectric" I/O typewriter).]

Unless another print cycle is begun during an initiated cycle, the link 13 is relaxed during the initiated cycle. Spring 11, acting on interposer 7 and through arm 19, pulls both interposers 7 and 9 leftwardly as seen in the drawing. This can occur at any time after the definite initiation of the previous cycle. Interposers 7 and 9 are ineffective until a full cycle is completed because only then does interposer 7 engage the extending tab 20 of spring 5 to thereby slightly unwind spring 5 an amount sufficient to effect decoupling of shaft 3 from shaft 1 and because interposer 9 does not engage the ledge 14 of wheel 15 until the ledge 14 is brought into position at the end of a cycle. After shaft 3 is stopped, it is turned counter-clockwise by the action of spring 5. However, this counter-clockwise movement is limited by check pawl 21 which engages a ledge 23 of wheel 25 as shown.

In the prior art machine the interposer 9 is not mobile. Abutment of the ledge of wheel 15 with interposer 9 prevented further rotation of driven shaft 3, but bounce and transfer of energy continued in the system containing shaft 3. The energy from the rotating shaft 3 was normally transferred back and forth between the interposer and shaft 3 until dissipated through internal losses in the mounts and beams of the system.

Oscillations resulted in the prior system. These oscillations lasted up to 15 milliseconds and caused wide variations in the force required to pull the interposer for a subsequent cycle. During the period of such oscillations, initiation of a new cycle by moving interposers 7 and 9 could cause coupling of shaft 1 to shaft 3 by spring 5 at those times when backward bounce caused significant, additional stress in the system. The timing would be uncertain and structural injury and wear could occur. Beceause of such factors, a 15 millisecond delay before interposers 7 and 9 can be moved was generally built into the system in some way to provide time solely for damping the cycling mechanisms.

The system herein described differs from the prior system in the braking action used. In accordance with the inventive aspects of this system the interposer 9 is linked to a cantilever beam 27. The end of beam 27 is freely pivoted to the frame of the machine by a pin (not shown) inserted at the socket 29. Spring 31 biases beam 27 so that it will normally be up and will therefore dispose interposer 9 up. Shelf 33, near the end of beam 27, is rigidly connected to the frame (not shown) so that the end of beam 27 engages shelf 33 and is then prevented from further upward movement. Weights 35 are integrally connected to beam 27 to give the composite entity connected to interposer 9 an acceleration inertia equal to the acceleration inertia of the parts connected to brake wheel 15. That is, the acceleration inertia of the integral elements essentially made up of wheel 15, shaft 3, and all the parts connected to shaft 3, is equal to the acceleration inertia of the entity essentially made up of interposer 9 and beam 27 and all the parts connected to them.

Abutment 37 depends from and is integral with beam 27. Somewhat below abutment 37 is dash pot 39, which may be of conventional construction. A dash pot, of course, is a device which transforms energy of motion into some other form of energy which is not then returned to the system in a manner which causes significant motion of the system.

Assuming that the acceleration inertias are always matched as described, the desired, very sudden braking action occurs regardless of the speeds of shaft 3. Thus, when link 13 is relaxed, interposer 9 is pulled by spring 11 to wheel 15. When ledge 14 on wheel 15 comes around to impact interposer 9, spring clutch 5 is decoupled at substantially the same time by interposer 7; and, when ledge 14 and interposer 9 impact, two functional entities having substantially the same acceleration inertia in the direction of movement collide and the stationary one therefore moves away carrying all of the energy of the first. The wheel 15, shaft 3, and all of the parts carried by them stop almost instantly.

Interposer 9 and beam 27 move away initially in the direction of the impacting force and then on an arc defined by the stationary pivot found at socket 29. The movement of interposer 9 and beam 27 do not, however, effect immediate subsequent operation of the system. If link 13 is pulled to start another cycle during this movement arm 19 is still behind interposer 7 and will pull it out from under tab 20. A cycle will begin and, since shaft 3 is at a dead stop, the new cycle will not be structurally disturbed by bounce in the system. A new cycle may therefore be started almost immediately after braking a prior cycle.

Abutment 37 contacts dash pot 39 shortly after downward movement of beam 27 is initiated by a braking impact as described. All of the energy carried by beam 27 and the other then moving members is absorbed in the course of a time while abutment 37 moves deeper into dash pot 39. In the preferred embodiment a cycle is about 60 milliseconds long, and this is more than ample time to absorb all of the energy of the beam 27 and other moving members. It is also ample time to permit spring 31 to restore beam 27 and thus interposer 9 to braking position.

This absorption of energy by dash pot 39 and restoration of position by spring 31 occurs automatically. The spring 31 is constantly pulling up and it simply takes effect when sufficient energy is absorbed by dash pot 39.

In the form of the invention herein shown, the shaft 3 carries certain cams which contact bails and cam followers during a cycle. The load during a cycle is variable depending on the typing operation conducted. At the position of braking, however, when the cycle is almost over, the bails and cam followers are no longer mechanically linked with the cams. The shaft 3 therefore always has the same physical structure at the time of braking. Thus, the acceleration inertia of the typewriter components is constant. The braking components may therefore be built as shown, to have one acceleration inertia.

The question has been raised as to whether this invention has utility if the mechanisms connected to shaft 3 differ at the time of braking so that different acceleration inertias will be exhibited by the typewriter mechanisms. It was quickly pointed out to me that certain simple design changes could compensate for this if the acceleration inertia of the typewritter mechanisms would always be one of a limited number of values. In this case several different structures on the order of beam 27 would be provided and they would be biased into contact by at least one relatively light spring. These would be situated so that the bottom ones would combine to total in acceleration inertia the various, different acceleration inertias possible in the typewriter mechanisms. Thus, when the typewriter mechanisms are in certain acceleration inertias, one or more of the beams would move away in a manner exactly analogous to the movement of two balls from one end of a line of balls when two balls impact the far end. When the typewriter mechanisms assume another acceleration inertia, it need only be one substantially identical to that represented by one or more of the bottom members which would be situated in the manner of beam 27 in the preferred embodiment. Thus, members which total in acceleration inertia the acceleration inertia of the impacting mechanisms would automatically move away and the typewriter mechanisms would again come to an almost instantaneous stop.

The matching of acceleration inertias in the design of the preferred or some other system is best done by experimentation. Linear inertia, internal and external structure, resiliancy of the material of the structure, and physical dimensions of the structure are believed to be involved. A basic point in the experiments is to recognize that the kinetic energy of the moving body will be represented by a certain velocity of a certain mass, and that this energy should all be transferred to the breaking mass in which it will again appear as velocity of that mass.

Acceleration inertias may be different along different directions or axes of a structure. However, this difference is rarely a factor in design or description in accordance with this invention. Therefore, unless the contrary is expressed, acceleration inertia will be used here without further qualification to mean the inertia in the linear direction of the force of braking.

While the invention has been particularly shown and described with reference to a preferred embodiment thereof, it will be understood by those skilled in the art that the foregoing and other changes in form and details may be made therein without departing from the spirit and scope of the invention.

I claim:
1. A brake comprising:
   a rotatably mounted movable mechanism having a shaft and an abutment connected to said shaft for rotation therewith,
   at least one mass mounted to be selectively interposed in the path of said moving abutment and to be movable initially in the direction of the force of impact from said moving mechanism,
   said mass having an acceleration inertia substantially equal to the acceleration inertia of said movable mechanism and being mounted so that said mass moves away freely after impact while at least said movable mechanism substantially stops suddenly without substantial bounce.

2. The brake as in claim 1 also including energy dissipating means in the path of said mass to absorb the kinetic energy of said mass and also including means to restore said mass to a normal position for subsequent braking.

3. The brake as in claim 2 in which said means to restore is a spring connecting said mass to a relatively stationary point.

4. The brake as in claim 1 in which said moving mechanism is normally of one acceleration inertia and said mass is a composite entity of said one acceleration inertia so that all of said mass moves away during each normal braking operation.

5. The brake as in claim 4 also including energy dissipating means in the path of said mass to dissipate the kinetic energy of said mass and also including means to restore said mass to a normal position for subsequent braking.

6. The brake as in claim 5 in which said means to restore is a spring connecting said mass to a relatively stationary point.

7. The combination as in claim 2 including a clutching means operative on said movable mechanism and linked so that selective movement of said mass to a position allowing said mechanism to begin movement also controls said clutching means.

8. The combination as in claim 5 including a clutching means operative on said movable mechanism and linked so that selective movement of said mass to a position allowing said mechanism to begin movement also controls said clutching means.

9. A control system for a cycling mechanism comprising:
   a drive shaft,
   a driven shaft,
   a clutch having a clutch control and linking said drive shaft and said driven shaft,
   a ledge on said driven shaft,
   a first interposer assembly operative to contact said ledge and a second interposer assembly operative to contact said clutch control, said two assemblies being movable to operative or non-operative positions,
   the said first interposer assembly having a portion movable away freely after impact with said ledge and having an acceleration inertia which is normally always substantially the same as the acceleration inertia of the mass essentially integral with said ledge so that said portion movable moves away freely after impact while at least said driven shaft stops suddenly without substantial bounce.

10. The control system as in claim 9 wherein said mass essentially integral with said ledge is normally of one acceleration inertia and said first interposer assembly is a composite entity of said one acceleration inertia, said control system including energy dissipating means in the path of said first interposer assembly to dissipate the kinetic energy of said first interposer assembly and also including resilient means connecting siad first interposer assembly to a frame to thereby restore said first interposer assembly to a normal position for subsequent braking.

References Cited
UNITED STATES PATENTS

| | | | |
|---|---|---|---|
| 1,173,423 | 2/1916 | Hagelstein | 192—149 |
| 2,155,052 | 4/1939 | Byland | 188—1 |
| 3,062,036 | 11/1962 | York | 73—12 |

BENJAMIN W. WYCHE, III, *Primary Examiner.*